(12) United States Patent
Cho et al.

(10) Patent No.: US 12,153,238 B2
(45) Date of Patent: Nov. 26, 2024

(54) POLARIZING PLATE AND OPTICAL DISPLAY DEVICE INCLUDING SAME

(71) Applicant: SAMSUNG SDI CO., LTD., Yongin-si (KR)

(72) Inventors: Sung Man Cho, Suwon-si (KR); Mun Bo Ko, Suwon-si (KR); Ki Yong Kim, Suwon-si (KR); Yeon Ju Na, Suwon-si (KR); Eun Sol Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 608 days.

(21) Appl. No.: 17/439,341

(22) PCT Filed: Mar. 3, 2020

(86) PCT No.: PCT/KR2020/003021
§ 371 (c)(1),
(2) Date: Sep. 14, 2021

(87) PCT Pub. No.: WO2020/189925
PCT Pub. Date: Sep. 24, 2020

(65) Prior Publication Data
US 2022/0195081 A1 Jun. 23, 2022

(30) Foreign Application Priority Data
Mar. 20, 2019 (KR) .......................... 10-2019-0031877

(51) Int. Cl.
| | | |
|---|---|---|
| *G02B 5/30* | (2006.01) | |
| *B32B 7/12* | (2006.01) | |
| *B32B 23/20* | (2006.01) | |
| *B32B 27/30* | (2006.01) | |
| *C08F 20/06* | (2006.01) | |
| *G02F 1/1335* | (2006.01) | |
| *B32B 23/08* | (2006.01) | |

(52) U.S. Cl.
CPC .............. *G02B 5/3033* (2013.01); *B32B 7/12* (2013.01); *B32B 23/20* (2013.01); *B32B 27/306* (2013.01); *C08F 20/06* (2013.01); *G02B 5/30* (2013.01); *G02F 1/1335* (2013.01); *G02F 1/133528* (2013.01); *B32B 23/08* (2013.01); *B32B 2250/40* (2013.01); *B32B 2255/10* (2013.01); *B32B 2307/4026* (2013.01); *B32B 2307/42* (2013.01); *B32B 2457/20* (2013.01); *C08F 2810/20* (2013.01); *C09K 2323/031* (2020.08)

(58) Field of Classification Search
CPC .............. G02B 5/3033; G02F 1/33528; B32B 2307/42; C09K 2323/031; C09D 4/00; C08F 220/06
See application file for complete search history.

(56) References Cited

U.S. PATENT DOCUMENTS

2005/0117219 A1    6/2005   Hayashi et al.

FOREIGN PATENT DOCUMENTS

| CN | 1616995 | A |   | 5/2005 | |
|---|---|---|---|---|---|
| CN | 103827158 | A |   | 5/2014 | |
| CN | 104246548 | A |   | 12/2014 | |
| CN | 107209312 | A |   | 9/2017 | |
| CN | 113614591 | B | * | 11/2023 | ............. B32B 23/08 |
| JP | 2010-235731 | A |   | 10/2010 | |
| JP | 2016-188313 | A |   | 11/2016 | |
| KR | 10-2010-0089793 | A |   | 8/2010 | |
| KR | 10-2013-0025321 | A |   | 3/2013 | |
| KR | 10-2013-0050127 | A |   | 5/2013 | |
| KR | 10-2016-0038143 | A |   | 4/2016 | |
| KR | 10-2016-0091014 | A |   | 8/2016 | |
| KR | 102424461 | B1 | * | 7/2022 | ........... G02B 5/3033 |
| WO | WO 2010/090449 | A2 |   | 8/2010 | |

OTHER PUBLICATIONS

Korean Office Action in corresponding Korean Patent Application No. 10-2019-0031877, Korean Office Action issued Oct. 18, 2021 (4 pgs.).
Chinese Office Action dated Dec. 2, 2022 issued in corresponding Chinese Application No. 202080022398.2 (9 pages).
International Search Report of PCT/KR2020/003021, Jul. 24, 2020, 4 pp.

* cited by examiner

*Primary Examiner* — Sophie Hon
(74) *Attorney, Agent, or Firm* — Lewis Roca Rothgerber Christie LLP

(57) ABSTRACT

A polarizing plate and an optical display device comprising the same are disclosed. The polarizing plate includes a polarizer comprising a zinc cation and a unit represented by the Formula 1, and the polarizing plate has a chrominance variation ΔE of about 5.2 or less, as calculated by Equation 1.

14 Claims, No Drawings

POLARIZING PLATE AND OPTICAL DISPLAY DEVICE INCLUDING SAME

CROSS-REFERENCE TO RELATED APPLICATIONS

This application is a U.S. National Phase Patent Application of International Application Number PCT/KR2020/003021, filed on Mar. 3, 2020, which claims priority of Korean Patent Application Number 10-2019-0031877, filed on Mar. 20, 2019, the entire content of each of which is incorporated herein by reference.

TECHNICAL FIELD

The present invention relates to a polarizing plate and an optical display device including the same. More particularly, the present invention relates to a polarizing plate having good properties in terms of durability, optical reliability and appearance even after being left under high temperature for a long period of time, and an optical display device including the same.

BACKGROUND ART

A polarizing plate may include a polarizer and a protective layer stacked on at least one surface of the polarizer. Polarizing plates are used in optical display devices, and can be inevitably exposed to high temperature and/or high temperature/humidity conditions for a long period of time. Polarization of the polarizing plate is mainly achieved by the polarizer in the polarizing plate. The polarizer is fabricated by uniaxially stretching an iodine-dyed polyvinyl alcohol film. However, when the polarizing plate is left at high temperature for a long period of time, it may suffer from yellowing and poor durability.

In order to improve thermal resistance of a polarizing plate, zinc may be added to a polarizer. In this case, however, the polarizing plate may suffer from deterioration in the degree of polarization and light transmittance at high temperature due to migration of zinc to the surface of the polarizer. Alternatively, a crosslinking agent may be added to the polyvinyl alcohol film constituting the polarizer to allow crosslinking of hydroxyl groups in the polyvinyl alcohol film. In this case, however, the stretched polyvinyl alcohol film may suffer from axis distortion, thereby causing deterioration in optical properties.

The background technique of the present invention is disclosed in Korean Patent Laid-open Publication No. 2016-0038143 and the like.

DISCLOSURE

Technical Problem

It is one object of the present invention to provide a polarizing plate having good durability even after being left under high temperature and/or high temperature/high humidity conditions for a long period of time.

It is another aspect of the present invention to provide a polarizing plate having good optical properties and appearance even after being left under high temperature and/or high temperature/high humidity conditions for a long period of time.

It is another aspect of the present invention to provide a polarizing plate that can realize good properties in terms of durability, optical properties and appearance even after being left under high temperature for a long period of time simply and economically.

Technical Solution

One aspect of the present invention is a polarizing plate.
1. The polarizing plate comprises a polarizer comprising a zinc cation and a unit represented by the following Formula 1:

[Formula 1]

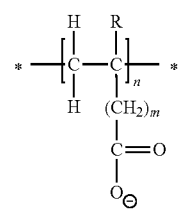

(where * is a linking site,
R is a hydrogen or a $C_1$ to $C_5$ alkyl group,
n is an integer of 10 to 100,000, m is an integer of 0 to 10),
wherein the polarizing plate has a chrominance variation $\Delta E$ of about 5.2 or less, as calculated by Equation 1:

$$\Delta E = [(\Delta L)^2 + (\Delta a^*)^2 + (\Delta b^*)^2]^{1/2}$$  [Equation 1]

(where $\Delta L$ is L2−L1; $\Delta a^*$ is $(a^*)2−(a^*)1$; and $\Delta b^*$ is $(b^*)2−(b^*)1$, in which L1 is an L value of an initial polarizing plate; L2 is an L value of the polarizing plate after the polarizing plate is left at about 95° C. for about 500 hours; $(a^*)1$ is an $a^*$ value of an initial polarizing plate; $(a^*)2$ is an $a^*$ value of the polarizing plate after the polarizing plate is left at about 95° C. for about 500 hours; $(b^*)1$ is a $b^*$ value of an initial polarizing plate; and $(b^*)2$ is a $b^*$ value of the polarizing plate after the polarizing plate is left at about 95° C. for about 500 hours).
2. In Embodiment 1, the zinc cation may include a zinc divalent cation.
3. In Embodiments 1 to 2, the zinc cation may be present in an amount of about 10 ppm to about 5,000 ppm in the polarizer.
4. In Embodiments 1 to 3, the unit represented by the Formula 1 may be present in an amount of more than about 0 wt % and about 35 wt % or less.
5. In Embodiments 1 to 2, the polarizer may comprise a cross-linked product of organic acid zinc salt.
6. In Embodiment 5, the zinc cation and the unit represented by the Formula 1 are derived from the organic acid zinc salt or the cross-linked product of organic acid zinc salt.
7. In Embodiments 5 to 6, the organic acid zinc salt may comprise the zinc cation and a salt of organic acid anion represented by the following Formula 2:

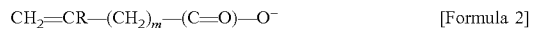  [Formula 2]

(where, R is a hydrogen or a $C_1$ to $C_5$ alkyl group,
m is an integer of 0 to 10).
8. In Embodiments 5 to 7, the organic acid zinc salt may comprise at least one of zinc (meth)acrylate and 10-undecenoic acid zinc salt.
9. In Embodiments 5 to 8, the cross-linked product of organic acid zinc salt may comprise a UV cured product of organic acid zinc salt.

10. In Embodiments 1 to 9, the polarizer may comprise a photo-radical initiator.
11. In Embodiments 1 to 10, the polarizer may be free from at least one of an inorganic acid zinc salt, a zinc halogenide salt and an organic acid zinc salt without photocurable functional group.
12. In Embodiments 1 to 11, the polarizer may be free from at least one of an inorganic acid anion, a halogenated anion and an organic acid anion without photocuring functional group.
13. In Embodiments 1 to 12, the polarizing plate further comprise a protective layer stacked on at least one side of the polarizer.

The optical display device of the invention comprises the foregoing polarizing plat of the invention.

Advantageous Effects

The present invention provides a polarizing plate having good durability even after being left under high temperature and/or high temperature/high humidity conditions for a long period of time.

The present invention provides a polarizing plate having good optical properties and appearance even after being left under high temperature and/or high temperature/high humidity conditions for a long period of time.

The present invention provides a polarizing plate that can simply and economically realize good properties in terms of durability, optical properties and appearance even after being left under high temperature for a long period of time.

BEST MODE

Hereinafter, embodiments of the present invention will be described in detail with reference to the accompanying drawings such that the present invention can be easily realized by a person having ordinary knowledge in the art. It should be understood that the present invention is not limited to the following embodiments and may be embodied in different ways.

Herein, the chrominance variation (ΔE) is a value calculated by Equation 1:

$$\Delta E=[(\Delta L)^2+(\Delta a^*)^2+(\Delta b^*)^2]^{1/2}$$ [Equation 1]

(where ΔL is L2-L1; Δa* is (a*)2-(a*)1; and Δb* is (b*)2-(b*)1, in which L1 is an L value of an initial polarizing plate; L2 is an L value of the polarizing plate after the polarizing plate is left at about 95° C. for about 500 hours; (a*)1 is an a* value of an initial polarizing plate; (a*)2 is an a* value of the polarizing plate after the polarizing plate is left at about 95° C. for about 500 hours; (b*)1 is a b* value of an initial polarizing plate; and (b*)2 is a b* value of the polarizing plate after the polarizing plate is left at about 95° C. for about 500 hours).

Herein, the term "initial polarizing plate" means a polarizing plate before the polarizing plate is left at about 95° C. for about 500 hours. L, a*, and b* indicate color space values according to CIE1976, and may be measured using a spectrophotometer (for example: CM-3600A, Konica Minolta Co., Ltd.), but is not limited thereto.

Herein, "X to Y" used to indicate numerical range refers to "X or more to Y or less" or "X≤ and ≤Y".

As used herein, the term "(meth)acryl" refers to acryl and/or methacryl.

The inventors have found that the smaller the value of ΔE according to Equation 1 after leaving a polarizer at a high temperature for a long time, the occurrence of yellowing of the polarizer at high temperature can be minimized, and the polarizing plate may have excellent durability, so that it can be suitably used for an optical display device.

Accordingly, the inventors applied a polarizer comprising a zinc cation and a unit represented by the following Formula 1 to a polarizing plate. The polarizing plate could achieve a chrominance variation ΔE of about 5.2 or less, as calculated by Equation 1. The polarizing plate having ΔE of about 5.2 or less in Equation 1 may have high reliability at high temperature and/or high temperature and high humidity. Further, the inventors of the present invention completed the present invention by confirming that the orientation of the polyvinyl alcohol resin in the polarizer is not distorted even after leaving the polarizing plate at a high temperature for a long period of time, whereby the polarizing plate had extremely low variation of polarization degree and low light transmittance variation even after leaving the polarizing plate at a high temperature for a long period of time and thus the polarizing plate may obtain excellent optical properties and reliability.

Hereinafter, a polarizing plate according to one embodiment of the present invention will be described.

The polarizing plate of the invention includes a polarizer and a first protective layer stacked on an upper surface of the polarizer. The upper surface of the polarizer may be a light incident surface of the polarizer or a light exit surface of the polarizer.

The polarizing plate has a chrominance variation ΔE of about 5.2 or less, as calculated by Equation 1. Within this range, the polarizing plate may have good durability and can be suitably used in optical display devices, thereby increasing a lifetime of the optical display devices and providing economic benefits. For example, the polarizing plate may have a chrominance variation ΔE according to Equation 1 of about 0 to about 5.2.

The polarizing plate may have a variation of polarization degree ΔP according to Equation 2 of about 1.5% or less, for example, about 0% to about 1.5%, and a light transmittance variation ΔT according to Equation 3 of about 2% or less, for example, about 0% to about 2%. Within this range, the polarizing plate may have good durability and can be suitably used in optical display devices, thereby increasing a lifetime of the optical display devices and providing economic benefits:

$$\Delta P=|P2-P1|$$ [Equation 2]

(where $P_1$ is the degree of polarization of an initial polarizing plate and $P_2$ is the degree of polarization of the polarizing plate after the polarizing plate is left at about 95° C. for about 500 hours).

$$\Delta T=|T2-T1|$$ [Equation 3]

(where $T_1$ is a light transmittance of an initial polarizing plate and $T_2$ is a light transmittance of the polarizing plate after the polarizing plate is left at about 95° C. for about 500 hours).

In Equations 2 and Equations 3, the degree of polarization and the light transmittance are represented in %, respectively. Herein, the term "initial polarizing plate" means a polarizing plate before the polarizing plate is left at about 95° C. for about 500 hours.

In an embodiment, in Equation 2, each of $P_1$ and $P_2$ may be about 90% or more, for example, about 95% or more, about 95% to about 100%, respectively. In an embodiment, in Equation 3, each of $T_1$ and $T_2$ may be about 40% or more, for example, about 40% or more, about 40% to about 50%, respectively. Within these ranges, the polarizing plate can be suitably used in optical display devices, and the screen quality may not be deteriorated even after the polarizing plate is left under high temperature.

Next, the polarizer of the invention will be described in more detail.

The polarizer polarizes light, thereby improving visibility and screen quality when applied to an optical display.

The polarizer may include a polarizer formed of a polyvinyl alcohol film. For example, the polarizer may include a polyvinyl alcohol-based polarizer obtained by dyeing a polyvinyl alcohol film with iodine and the like, or a polyene-based polarizer obtained by dehydrating the polyvinyl alcohol film.

The polarizer may have a thickness of about 5 μm to about 50 μm, for example, 5 μm, 10 μm, 15 μm, 20 μm, 25 μm, 30 μm, 35 μm, 40 μm, 45 μm, or 50 μm, specifically, about 5 μm to about 30 μm. Within this thickness range, the polarizer may be used in an optical display.

The polarizer comprises a zinc cation. The zinc cation has a function of blocking heat, so if a polarizer or a polarizing plate is left at high temperature, the zinc cation may prevent external heat from being transferred to the inside of the polarizer. Further, the zinc cation may form a chelate with the hydroxyl group of the polarizer, thereby preventing sublimation of iodine ions ($I_5^-$ or $I_3^-$) and thus preventing yellowing, whereby the durability of the polarizing plate can be increased.

The zinc cation may be present in an amount of about 10 ppm to 5,000 ppm, for example, 10 ppm, 50 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 1550 ppm, 1600 ppm, 1650 ppm, 1700 ppm, 1750 ppm, 1800 ppm, 1850 ppm, 1900 ppm, 1950 ppm, 2000 ppm, 2050 ppm, 2100 ppm, 2150 ppm, 2200 ppm, 2250 ppm, 2300 ppm, 2350 ppm, 2400 ppm, 2450 ppm, 2500 ppm, 2550 ppm, 2600 ppm, 2650 ppm, 2700 ppm, 2750 ppm, 2800 ppm, 2850 ppm, 2900 ppm, 2950 ppm, 3000 ppm, 3050 ppm, 3100 ppm, 3150 ppm, 3200 ppm, 3250 ppm, 3300 ppm, 3350 ppm, 3400 ppm, 3450 ppm, 3500 ppm, 3550 ppm, 3600 ppm, 3650 ppm, 3700 ppm, 3750 ppm, 3800 ppm, 3850 ppm, 3900 ppm, 3950 ppm, 4000 ppm, 4050 ppm, 4100 ppm, 4150 ppm, 4200 ppm, 4250 ppm, 4300 ppm, 4350 ppm, 4400 ppm, 4450 ppm, 4500 ppm, 4550 ppm, 4600 ppm, 4650 ppm, 4700 ppm, 4750 ppm, 4800 ppm, 4850 ppm, 4900 ppm, 4950 ppm, or 5000 ppm, specifically, 100 ppm to 2,500 ppm in the polarizer. Within these ranges, the polarizing plate may have an increased durability by suppressing the occurrence of yellowing of the polarizing plate. Herein, the amount of the zinc cation in the polarizer can be measured by ICP-OES (Inductively Coupled Plasma-Optical Emission Spectrometer) method using Agilent 5100 series, but is not limited thereto.

The zinc cation may include a zinc monovalent cation, a zinc divalent cation and a zinc trivalent cation, for example, the zinc cation may be a zinc divalent cation ($Zn^{2+}$). The zinc divalent cation is preferred in that it can be easily introduced into the polarizer.

The zinc cation may be contained within the polarizer or on the surface of the polarizer.

The amount of the zinc cation in the polarizer can be adjusted by the amount of the organic acid zinc salt, which will be described below, which is introduced during the manufacturing process of the polarizer from the polyvinyl alcohol film.

The polarizer comprises a unit represented by the following Formula 1:

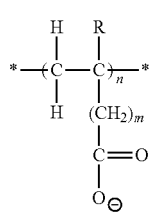

[Formula 1]

(where * is a linking site,
R is a hydrogen or a $C_1$ to $C_5$ alkyl group,
n is an integer of 10 to 100,000, m is an integer of 0 to 10).

In Formula 1, if n is less than 10, the durability of the polarizer may not be improved. If n is more than 100,000, miscibility with a chain of polyvinyl alcohol is poor, and thus separation between the polarizer and the first protective layer may occur.

In Formula 1, m is the number of repeating units between the main chain and the carbonyl group. If m is more than 10, the organic acid zinc salt described below is not soluble in water, so it cannot be used in the polarizer manufacturing process. In an embodiment, n may be 20 to 80,000.

The unit represented by the Formula 1 may be formed by crosslinking of photocurable functional groups by UV irradiation to a photocurable bonding agent in the process of bonding the polarizer and the protective layer or by UV irradiation to an organic acid zinc salt described below during the preparation of the polarizer.

The presence of the unit represented by the Formula 1 can be confirmed through a FT-NMR (Fourier Transform-Nuclear Magnetic Resonance, BRUKER社, ULTRA-SHIELD 300) analysis of the polarizer, but is not limited thereto.

The unit represented by the Formula 1 may be present in an amount of more than about 0 wt % and about 35 wt % or less, preferably, more than about 0 wt % and about 20 wt % or less. Within this range, the effects of the present invention can be achieved.

The unit represented by the Formula 1 may be contained within the polarizer or on the surface of the polarizer.

The unit represented by the Formula 1 may be derived from the organic acid zinc salt which will be described below.

Conventionally, in order to improve durability of polarizing plates, zinc inorganic salts (e.g. zinc halides such as zinc chloride, zinc iodide, zinc sulfate, or zinc acetate) have been added to the polarizer. In this case, however, zinc cation is not stabilized and migrates to the surface of the polarizer, so the durability was not sufficiently improved. On the other hand, according to the present invention, the durability of the polarizer can be remarkably increased by introducing zinc cation and unit of Formula 1 together, and securing the zinc cation and the unit of Formula 1 in a polarizer by UV curing.

The organic acid zinc salt is a salt of zinc cation and organic acid anion. The zinc cation is as described above. The organic acid anion may be represented by the following Formula 2:

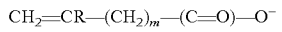  [Formula 2]

(where, R is a hydrogen or a $C_1$ to $C_5$ alkyl group,
m is an integer of 0 to 10).

Since the organic acid anion contains both —(C=O)—O⁻ anion and a photocurable functional group $CH_2=CR$—* (*is a linking site, R is hydrogen or a $C_1$ to $C_5$ alkyl group) together, the movement of zinc cation can be inhibited through ionic bonding between —(C=O)—O⁻ anion and zinc cation, and even if the organic acid anion has a low weight average molecular weight, the polarizer may have improved heat resistance and mechanical properties through chemical crosslinking of the photocurable functional groups $CH_2=CR$—* (*is a linking site, R is hydrogen or a $C_1$ to $C_5$ alkyl group) and through its function as a filler. In addition, since $CH_2=CR$—* (*is a linking site, R is hydrogen or a $C_1$ to $C_5$ alkyl group) does not chemically crosslink with polyvinyl alcohol, the orientation of the polyvinyl alcohol is not distorted, whereby the polarizing plate may have extremely low variation of polarization degree and low light transmittance variation even after leaving the polarizing plate at a high temperature for a long period of time When using an organic acid in the form of a polymer having a high weight average molecular weight (eg, polyacrylic acid, etc.) or a salt containing the organic acid anions in the form of a polymer having a high weight average molecular weight, it is difficult to penetrate into the polarizer, so an excess amount is required, and the penetration into the polarizer is not uniform, whereby physical properties and appearance of the polarizer may be deteriorated.

The photocurable functional group $CH_2=CR$—* (*is a linking site, R is hydrogen or a $C_1$ to $C_5$ alkyl group) may stabilize the zinc cation to prevent migration to the surface of the polarizer, and improves the mechanical properties of the polarizer through crosslinking, and to prevent sublimation of iodine ions ($I_5^-$ or $I_3^-$) to improve durability of the polarizing plate.

The photocurable functional group $CH_2=CR$—* (*is a linking site, R is hydrogen or a $C_1$ to $C_5$ alkyl group) in the organic acid anion may be cured by a separate UV irradiation treatment process. Further, the photocurable functional group $CH_2=CR$—* (*is a linking site, R is hydrogen or a $C_1$ to $C_5$ alkyl group) in the organic acid anion may be cured simultaneously with the bonding layer by a UV irradiation treatment process when forming the bonding layer described below.

In Formula 2, m may be 0, 1, 2, 3, 4, 5, 6, 7, 8, 9 or 10.

In Formula 2, R may be a hydrogen or a methyl group.

In the organic acid zinc salt, the number of the organic acid anion may be 1 to 3, preferably 2, depending on the oxidation state of the zinc cation.

In one embodiment, the organic acid zinc salt may include at least one of a zinc (meth)acrylate such as $[(H_2C=CH-CO_2)^-]_2Zn^{2+}$, $[(H_2C=CCH_3-CO_2)^-]_2Zn^{2+}$, 10-undecenoic acid zinc salt such as $[[H_2C=CH(CH_2)_8COO]^-]_2Zn^{2+}$, but is not limited thereto.

In one embodiment, the polarizer may include a crosslinked product of organic acid zinc salt. In one embodiment, the polarizer may include a UV cured product of organic acid zinc salt.

In the process of preparing a polarizer, an initiator can be added to promote chemical crosslinking (eg, photocuring) of the organic acid zinc salt. The initiator may include at least one of a photo-radical initiator and a photo cationic initiator, but is not limited thereto. In an embodiment, the initiator may include a photo-radical initiator. The photo-radical initiator and the photo cationic initiator may include conventional types known to those skilled in the art.

In one embodiment, the polarizer may include an initiator, for example, a photo-radical initiator. The initiator may be included in the polarizer or on the surface of the polarizer.

The initiator may be present in an amount of about 1 wt % to about 10 wt %, preferably about 2 wt % to about 6 wt %. Within this range, the organic acid anion can be cured without deterioration of light transmittance of the polarizer caused by residual initiator.

The polarizer may be free from at least one of an inorganic acid zinc salt, a zinc halogenide salt and an organic acid zinc salt without photocurable functional group. The polarizer may be free from at least one of an inorganic acid anion derived from inorganic acid zinc salts, a halogenated anion derived from zinc halogenide salt and an organic acid anion without photocuring functional group derived from organic acid zinc salt without photocurable functional group. The polarizer of the invention may have increased durability at high temperature without using at least one of an inorganic acid zinc salt, a zinc halogenide salt and an organic acid zinc salt without photocurable functional group. The photocurable functional group may be CH2=CR—* (*is a linking site, R is a hydrogen or a $C_1$ to $C_5$ alkyl group). As the zinc inorganic acid salt and the zinc halogenide salt, conventional types known to those skilled in the art may be employed. For example, the polarizer may be free from zinc inorganic acid salts such as zinc sulfate, zinc halogenide salts such as zinc iodide and zinc chloride, organic acid zinc salts without photocurable functional groups such as zinc acetate, sulfate anions, halogen anions, acetate anions, and the like.

The amount of zinc cation and the amount of the unit of Formula 1 in the polarizer can be controlled by adjusting the timing of the addition of the organic acid zinc salt and/or the amount of the organic acid zinc salt at each step of manufacturing a polarizer from a polyvinyl alcohol film.

The organic acid zinc salt may be added in at least one of dyeing treatment, stretching treatment, crosslinking treatment, and color complementation treatment described below.

The polarizer may be manufactured through processes of dyeing treatment, stretching treatment, crosslinking treatment, and color complementation treatment of a polyvinyl alcohol film. The order of dyeing treatment and stretching treatment is not particularly limited. In an embodiment, the polarizer may be manufactured without performing at least one of the crosslinking treatment and the color complementation treatment.

According to the method of preparing the polarizer of the invention, the order of dyeing and stretching is not limited. That is, the polyvinyl alcohol film may be dyed and then stretched, or stretched and then dyed, or dyeing treatment and stretching treatment may be performed simultaneously.

The polyvinyl alcohol film may be a typical polyvinyl alcohol film known to those skilled in the art. In an embodiment, the polyvinyl alcohol film may be a film formed of a polyvinyl alcohol or derivatives thereof. The polyvinyl alcohol may have a polymerization degree of about 1000 to about 5000, a saponification degree of about 80 mol % to about 100 mol %, a thickness of about 1 μm to 100 μm, specifically about 10 μm to about 70 μm. Within these ranges, the polyvinyl alcohol may be suitably used in preparation for thin polarizers.

The polyvinyl alcohol film may be subjected to a water washing treatment and swelling treatment prior to dyeing and stretching. By washing the polyvinyl alcohol film with water, foreign substances on the surface of the polyvinyl alcohol film can be removed. The polyvinyl alcohol film may be subjected to a swelling treatment so that the dyeing or stretching of the polyvinyl alcohol film can be better. The swelling treatment may be performed by leaving a polyvinyl alcohol film in a swelling bath filled with an aqueous solution as known to those skilled in the art. The temperature of swelling bath and the time of the swelling treatment are not particularly limited. The swelling bath may further include boric acid, inorganic acids, surfactants, and the like, and the amounts thereof may be adjusted.

The polyvinyl alcohol film may be dyed with a dichroic material in a dyeing bath containing a dichroic material. In the dyeing treatment, the polyvinyl alcohol film may be immersed in a dyeing solution, and the dyeing solution may be an aqueous solution containing a dichroic material. In an embodiment, the dichroic material may be an iodine compound including potassium iodide, hydrogen iodide, lithium iodide, sodium iodide, zinc iodide, lithium iodide, aluminum iodide, lead iodide, copper iodide, and the like. The dyeing solution may be an aqueous solution containing about 0.5 mol/ml to about 10 mol/ml of a dichroic material. Within this range, the polarizer may obtain a suitable polarization degree and can be used in an optical display device.

The dyeing bath may have a temperature of about 20° C. to about 45° C. and the immersion time of the polyvinyl alcohol film in the dyeing bath may be about 10 seconds to about 300 seconds. Within this range, the polarizer having a high polarization degree can be obtained.

In the process of dyeing the polyvinyl alcohol film, the dyeing bath may further contain an organic acid zinc salt. In this case, the organic acid zinc salt may be present in an amount of about 1 wt % to about 30 wt %, for example, about 2 wt % to about 15 wt % in the dyeing solution. When the organic acid zinc salt is contained in the dyeing solution, the dyeing bath may have a temperature of about 20° C. to about 45° C., and the immersion time of the polyvinyl alcohol film in the dyeing bath may be about 10 seconds to about 300 seconds. Within this range, the zinc cation of the invention may be secured.

The dyed polyvinyl alcohol film may be stretched in a stretching bath, thereby the dichroic material may be oriented, and accordingly the polyvinyl alcohol film may have a polarization. Specifically, the stretching can be performed by either a dry stretching or a wet stretching. The dry stretching may be performed by inter-roll stretching, compression stretching, heating roll stretching, or the like, and the wet stretching may be performed in a wet stretching bath containing water of about 35° C. to 70° C. The wet stretching bath may further include boric acid to increase a stretching effect.

The polyvinyl alcohol film may be stretched with a desired stretching ratio. Specifically, the polyvinyl alcohol film may be stretched with a total stretching ratio of about 5 times to about 7 times, for example, about 5.5 times to about 6.5 times. Within this range, the polyvinyl alcohol film does not suffer from cutting or wrinkles, and the polarizer obtained therefrom may have high polarization degree and transmittance. The stretching may be carried out with a uniaxial stretching, and can be performed in one-step stretching, but preferably, the stretching may be performed in multi-step stretching such as 2-step or 3-step stretching thereby preventing breakage of thin polarizer.

In the process of stretching the polyvinyl alcohol film, the stretching bath may further contain an organic acid zinc salt. In this case, the organic acid zinc salt may be present in an amount of about 1 wt % to about 30 wt %, for example, about 2 wt % to about 15 wt % in the wet stretching bath. When the organic acid zinc salt is added in the process of stretching the polyvinyl alcohol film, the wet stretching bath may have a temperature of about 35° C. to about 70° C., and the immersion time of the polyvinyl alcohol film in the wet stretching bath may be about 10 seconds to about 300 seconds. Within this range, the polarizing plate may achieve a chrominance variation ΔE of about 5.2 or less, as calculated by Equation 1.

As described above, the polyvinyl alcohol film may be dyed and then stretched, but in another embodiment, the dyeing with the dichroic material and the stretching of the polyvinyl alcohol film may be performed in the same bath.

Before stretching the dyed polyvinyl alcohol film or after stretching the dyed polyvinyl alcohol film, the polyvinyl alcohol film may be subjected to a crosslinking treatment in a crosslinking bath. The crosslinking treatment is a process in which the polyvinyl alcohol film is strongly dyed with a dichroic material, and a boric acid may be used as a crosslinking agent. In order to increase the crosslinking effect, a phosphoric acid compound, potassium iodide, and the like may be further added. For example, the crosslinking bath may contain an aqueous solution comprising about 1 wt % to about 10 wt %, preferably about 2 wt % to about 6 wt % of boric acid.

In the process of crosslinking the polyvinyl alcohol film, the crosslinking bath may further contain an organic acid zinc salt. In this case, the organic acid zinc salt may be present in an amount of about 1 wt % to about 10 wt %, for example, about 2 wt % to about 5 wt % in the crosslinking bath. When the organic acid zinc salt is added in the process of crosslinking the polyvinyl alcohol film, the crosslinking bath may have a temperature of about 35° C. to about 70° C., and the immersion time of the polyvinyl alcohol film in the crosslinking bath may be about 10 seconds to about 300 seconds.

The dyed and stretched polyvinyl alcohol film may be subjected to a color complementation treatment in a color complementation bath.

The color complementation treatment may be performed by immersing the dyed and stretched polyvinyl alcohol film in a color complementation bath. Through the color complementation treatment, the polarizer may have lowered color value and improved durability. The color complementation bath may contain potassium iodide in an amount of greater than about 0 wt % and about 10 wt % or less, preferably about 1 wt % to about 5 wt %.

In the process of a color complementation of the polyvinyl alcohol film, the color complementation bath may further contain an organic acid zinc salt. In this case, the organic acid zinc salt may be present in an amount of about 1 wt % to about 10 wt %, for example, about 2 wt % to about 5 wt % in the color complementation bath. When the organic acid zinc salt is used in the process of color complementation of the polyvinyl alcohol film, the color complementation bath may have a temperature of about 35° C. to about 65° C., and the immersion time of the polyvinyl alcohol film in the color complementation bath may be about 10 seconds to about 300 seconds. Within this range, the desired polarizer of the invention can be obtained.

First Protective Layer

The first protective layer may be formed on an upper surface of the polarizer to protect the polarizer while improving mechanical strength of the polarizing plate. The first protective layer may include at least one of an optically transparent protective film and an optically transparent protective coating layer.

When the first protective layer is a protective film type, the first protective layer may include a protective film formed of an optically transparent resin. The protective film may be formed through melting and extrusion of the resin. The resin may be further subjected to stretching, as needed. The resin may include at least one of cellulose ester resins including triacetylcellulose, cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, polyacrylate resins including poly(methyl methacrylate), polyvinyl alcohol resins, polyvinyl chloride resins, and polyvinylidene chloride resins.

When the first protective layer is a protective coating layer type, the protective coating layer can improve adherence to the polarizer, transparency, mechanical strength, thermal stability, moisture shielding, and durability of the polarizer. In one embodiment, the protective coating layer for the first protective layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group therein, or an oxetane compound having at least one oxetane ring therein. The radical polymerizable curable compound may be a (meth)acrylic compound having at least one (meth)acryloyloxy group therein.

The first protective layer may have a thickness of about 5 μm to about 200 specifically about 30 μm to about 120 The first protective layer of a protective film type may have a thickness of about 50 μm to about 100 μm and the first protective layer of a protective coating layer type may have a thickness of about 5 μm to about 50 μm. Within this range, the first protective layer can be used in the polarizing plate.

The polarizing plate may further include a functional coating layer, for example, a hard coating layer, an anti-fingerprint layer, or an anti-reflective layer on an upper surface of the first protective layer.

Bonding Layer

The first protective layer may be bonded to the polarizer via a bonding layer. The bonding layer may be formed from typical bonding agents for polarizing plates known to those skilled in the art. For example, the bonding layer may be formed by a water-based bonding agent or a photocurable bonding agent. Preferably, the bonding layer is formed by a photocurable bonding agent, thereby increasing degree of chemical crosslinking of organic acid anions in the organic acid zinc salt, and accordingly, an additional UV treatment process for crosslinking of the organic acid anions can be omitted, and thus, processability can also be improved.

The photocurable bonding agent may include an initiator and at least one of an epoxy compound and a (meth)acrylate compound. The initiator may include at least one of a photo-cationic initiator and a photo-radical initiator. The photocurable bonding agent may further include typical additives, such as an antioxidant, a pigment, and the like. The bonding layer may have a thickness of about 0.1 μm to about 10 μm. Within this thickness range, the bonding layer can be used in an optical display device.

On the lower surface of the polarizer, an adhesive layer may be laminated to attach the polarizing plate to a liquid crystal panel. The adhesive layer may be formed of a pressure sensitive adhesives (PSA), without being limited thereto.

Next, a polarizing plate according to another embodiment of the present invention will be described.

The polarizing plate according to this embodiment is substantially the same as the polarizing plate according to the above embodiment except that the polarizing plate further comprises a second protective layer at the lower surface of the polarizer The second protective layer may be laminated on the lower surface of the polarizer to protect the polarizer, while improving mechanical strength of the polarizing plate.

The second protective layer may be formed of the same composition as or a different composition from the first protective layer. The second protective layer may have the same thickness as or a different thickness from the first protective layer.

Next, an optical display according to the present invention will be described.

The optical display according to the present invention may include the polarizing plate according to the present invention.

The optical display may include at least one of a liquid crystal display and a light emitting device display. For the light emitting device display, the light emitting device includes an organic or organic-inorganic light emitting device and may mean a light emitting diode (LED), an organic light emitting diode (OLED), a quantum dot light emitting diode (QLED), and other devices including light emitting materials such as phosphors.

Next, the present invention will be described in more detail with reference to some examples. It should be understood that these examples are provided for illustration only and are not to be in any way construed as limiting the present invention.

Details of components used in Examples and Comparative Examples are as follows:

Example 1: Preparation of Polarizing Plate (1) Preparation of Polarizer

A polyvinyl alcohol film (VF-PS6000, Kuraray Co., Ltd., thickness: 60 μm) washed with water at 25° C. was subjected to a swelling in a swelling bath filled with water at 30° C. Then, the swollen film was dyed in a dyeing bath filled with an aqueous solution containing 1 ml/mol of potassium iodide at 30° C. for 65 seconds. The dyed film was allowed to pass through a wet crosslinking bath filled with an aqueous solution containing 3 wt % of boric acid at 30° C. Thereafter, the film passed through the crosslinking bath was stretched to 6 times an initial length thereof in an aqueous solution containing 3 wt % of boric acid at 65° C.

The stretched film was subjected to a color complementation in a color complementation bath filled with a complementary color solution, which is an aqueous solution containing 4.5 wt % of potassium iodide, 3 wt % of acrylate acid zinc salt ($[(H_2C=CHCO_2)^-]_2Zn^{2+}$) and 1 wt % of a photo-radical initiator (Darocur 1173; Ciba Specialty Chemicals) at 30° C. for 10 seconds. Then, the film was washed and dried, thereby obtaining a polarizer (thickness: 22 μm).

(2) Preparation of Polarizing Plate

A UV-curable bonding agent was applied to both sides of the polarizer obtained from the above. A triacetylcellulose (TAC) film (thickness: 80 μm, FujiTAC, Fuiji Co., Ltd.) was bonded to the one side of the polarizer and another TAC film (thickness: 80 μm, FujiTAC, Fuiji Co., Ltd.) was bonded to the other side of the polarizer to prepare a polarizing plate. As for the UV-curable bonding agent, KRX-4024 (ADEKA Co., Ltd.) (comprising 40 wt % of bisphenol A diglycidyl ether, 30 wt % of neopentyl glycol diglycidyl ether, 23 wt % of (3-ethyl-3[[(3-ethyloxetane-3-yl)methoxy]methyl]oxetane), and 7 wt % of an initiator) was used. The bonding agent was cured by UV irradiation.

Example 2 to Example 7

Each of polarizers and polarizing plates was prepared in the same manner as in Example 1 except that the composition of color complementation bath was changed as listed in Table 1 (unit: wt %).

Comparative Example 1 to Comparative Example 4

Each of polarizers and polarizing plates was prepared in the same manner as in Example 1 except that the composition of color complementation bath was changed as listed in Table 2 (unit: wt %).

The polarizers and the polarizing plates of Examples and Comparative Examples were evaluated as to the following properties and evaluations results are shown in Tables 1 and 2.

(1) Amount of zinc cation (unit: ppm): The amount of zinc cation in the polarizer was measured by an ICP-OES measurement method. The amount of zinc cation was measured using Agilent 5100 series.

(2) Chrominance variation (ΔE, no unit): L, a*, and b* values of each polarizing plate were measured using a spectrophotometer (CM-3600A, Konica Minolta Co., Ltd.). Then, the polarizing plate was left at 95° C. for 500 hours, followed by measuring L, a* and b* values in the same manner. Then, chrominance variation ΔE was calculated using the measured L, a* and b* values according to Equation 1.

(3) Variation of polarization degree (ΔP, unit: %): Degree of polarization of each polarizing plate was measured using a V-7100 (JASCO Co., Ltd.) at a wavelength of 380 nm to 780 nm before and after the polarizing plate was left at 95° C. for 500 hours. Then, the variation of polarization degree ΔP was calculated according to Equation 2.

(4) Light transmittance variation (ΔT, unit: %): Light transmittance of each polarizing plate was measured using a V-7100 (JASCO Co., Ltd.) at a wavelength of 380 nm to 780 nm before and after the polarizing plate was left at 95° C. for 500 hours. Then, the light transmittance variation ΔT was calculated according to Equation 3.

(5) Appearance: Each polarizing plate was left at left at 95° C. for 500 hours and then was observed with the naked eyes to identify whether or not yellowing occurs in the polarizing plate. When the yellowing was not visually recognized, it was evaluated as "OK." When the yellowing was visually recognized, it was evaluated as "NG."

TABLE 1

|  | Example | | | | | | |
|---|---|---|---|---|---|---|---|
|  | 1 | 2 | 3 | 4 | 5 | 6 | 7 |
| potassium iodide | 4.5 | 4.5 | 4.5 | 4.5 | 4.5 | 4.5 | 4.5 |
| zinc acrylate | 3 | 7 | 12 | 0 | 0 | 0 | 6 |
| 10-undecenoic acid zinc salt | 0 | 0 | 0 | 3 | 7 | 12 | 6 |
| zinc sulfate | 0 | 0 | 0 | 0 | 0 | 0 | 0 |
| acrylic acid | 0 | 0 | 0 | 0 | 0 | 0 | 0 |
| photoinitiator | 1 | 1 | 1 | 1 | 1 | 1 | 1 |
| amount of zinc cation | 400 | 1350 | 2200 | 370 | 1200 | 2450 | 2100 |
| ΔE | 4.8 | 3.6 | 2.2 | 5.0 | 4.1 | 2.7 | 3.9 |
| ΔP | 0.8 | 0.3 | 0.1 | 1 | 0.7 | 0.4 | 0.6 |
| ΔT | 1.1 | 0.6 | 0.3 | 1.2 | 0.6 | 0.3 | 0.7 |
| appearance | OK | OK | OK | OK | OK | OK | OK |

TABLE 2

|  | Comparative Example | | | |
|---|---|---|---|---|
|  | 1 | 2 | 3 | 4 |
| potassium iodide | 4.5 | 4.5 | 4.5 | 4.5 |
| zinc acrylate | 0 | 0 | 0 | 0 |
| 10-undecenoic acid zinc salt | 0 | 0 | 0 | 0 |
| zinc sulfate | 7 | 12 | 0 | 0 |
| acrylic acid | 0 | 0 | 7 | 12 |
| photoinitiator | 0 | 0 | 1 | 1 |
| amount of zinc cation | 950 | 2300 | 0 | 0 |
| ΔE | 16.8 | 9.8 | 22.7 | 24.2 |
| ΔP | 1.9 | 2.5 | 2.1 | 1.8 |
| ΔT | 14.6 | 6.9 | 20.6 | 24.9 |
| appearance | NG | NG | NG | NG |

As shown in Table 1, the polarizing plates according to the present invention exhibit excellent durability and appearance by using a polarizer with no yellowing even after being left at high temperature for a long period of time, and the present invention provides the polarizing plates having excellent optical characteristics and excellent optical reliability due to low variation of polarization degree and low light transmittance variation even after being left at high temperature for a long period of time.

On the contrary, as shown in Table 2, the polarizers of Comparative Examples 1 and 2, which do not contain a unit represented by the following Formula 1, and the polarizers of Comparative Examples 3 and 4, which do not contain a zinc cation could not achieve the desired effects.

It should be understood that various modifications, changes, alterations, and equivalent embodiments can be made by those skilled in the art without departing from the spirit and scope of the present invention.

The invention claimed is:

1. A polarizing plate comprising a polarizer film,
the polarizer film comprises a zinc cation coupled to a unit represented by the following Formula 1:

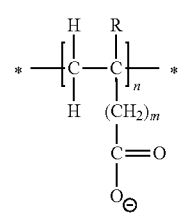

[Formula 1]

where * is a linking site,
R is a hydrogen or a $C_1$ to $C_5$ alkyl group,
n is an integer of 10 to 100,000, and m is an integer of 0 to 10,
wherein the polarizing plate has a chrominance variation ΔE of 5.2 or less, as calculated by Equation 1:

$$\Delta E=[(\Delta L)+(\Delta a^*)^2+(\Delta b^*)^2]^{1/2} \quad \text{[Equation 1]}$$

where ΔL is $L_2-L_1$; Δa* is $(a^*)_2-(a^*)_1$; and Δb* is $(b^*)_2-(b^*)_1$, in which $L_1$ is an L value of the polarizing plate before the polarizing plate is left at about 95° C. for about 500 hours; $L_2$ is an L value of the polarizing plate after the polarizing plate is left at about 95° C. for about 500 hours; $(a^*)_1$ is an a* value of the polarizing plate before the polarizing plate is left at about 95° C. for about 500 hours; $(a^*)_2$ is an a* value of the polarizing plate after the polarizing plate is left at about 95° C. for about 500 hours; $(b^*)_1$ is a b* value of the polarizing plate before the polarizing plate is left at about 95° C. for about 500 hours; and $(b^*)_2$ is a b* value of the polarizing plate after the polarizing plate is left at about 95° C. for about 500 hours, where the L value, the a* value, and the b* value indicate color space values according to CIE1976 and are measured using a spectrophotometer.

2. The polarizing plate according to claim 1, wherein the zinc cation includes a zinc divalent cation.

3. The polarizing plate according to claim 1, wherein the zinc cation is present in an amount of about 10 ppm to about 5,000 ppm in the polarizer.

4. The polarizing plate according to claim 1, wherein the unit represented by the Formula 1 is present in an amount of more than about 0 wt % and about 35 wt % or less.

5. The polarizing plate according to claim 1, wherein the polarizer film comprises a cross-linked product of an organic acid zinc salt.

6. The polarizing plate according to claim 5, wherein the zinc cation coupled to the unit represented by the Formula 1 are derived from the cross-linked product of the organic acid zinc salt or the organic acid zinc salt.

7. The polarizing plate according to claim 5, wherein the organic acid zinc salt comprises the zinc cation coupled to an organic acid anion represented by the following Formula 2:

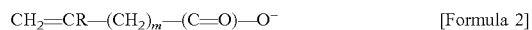

$$CH_2=CR-(CH_2)_m-(C=O)-O^-$$ [Formula 2]

where R is a hydrogen or a $C_1$ to $C_5$ alkyl group, and m is an integer of 0 to 10.

8. The polarizing plate according to claim 5, wherein the organic acid zinc salt comprises at least one of zinc (meth) acrylate and 10-undecenoic acid zinc salt.

9. The polarizing plate according to claim 5, wherein the cross-linked product of the organic acid zinc salt comprises a UV cured product of the organic acid zinc salt.

10. The polarizing plate according to claim 1, wherein the polarizer film comprises a photo-radical initiator.

11. The polarizing plate according to claim 1, wherein the polarizer film is free from at least one of an inorganic acid zinc salt, a zinc halogenide salt and an organic acid zinc salt without any photocurable functional group.

12. The polarizing plate according to claim 1, wherein the polarizer film is free from at least one of an inorganic acid anion, a halogenated anion and an organic acid anion without any photocuring functional group.

13. The polarizing plate according to claim 1, further comprising: a protective layer stacked on at least one side of the polarizer film.

14. An optical display device comprising the polarizing plate according to claim 1.

* * * * *